(12) United States Patent
Tang et al.

(10) Patent No.: US 6,931,391 B2
(45) Date of Patent: Aug. 16, 2005

(54) SYSTEMS AND METHODS FOR GENERATING PREDICTION QUERIES

(75) Inventors: Zhaohui Tang, Bellevue, WA (US); Rong Jian Guan, Sammamish, WA (US); Amir M. Netz, Bellevue, WA (US); Scott Conrad Oveson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 10/177,824

(22) Filed: Jun. 21, 2002

(65) Prior Publication Data

US 2003/0236784 A1 Dec. 25, 2003

(51) Int. Cl.[7] .................................................. G06F 17/30
(52) U.S. Cl. ............................ 707/2; 707/3; 707/101; 707/102
(58) Field of Search ................... 707/1–10, 100–104.1, 707/200–206

(56) References Cited

U.S. PATENT DOCUMENTS 6,263,345 B1 * 7/2001 Farrar et al. ............. 707/104.1
6,629,095 B1 * 9/2003 Wagstaff et al. ................ 707/5

OTHER PUBLICATIONS

Dehaspe, L., "Frequent Pattern Discovery in First–Order Logic," *AI Communications*, 1999, 12(1–2), 115–117.
Papazoglou, M.P. et al., "Knowledge Navigation in Networked Digital Libraries," *Knowledge Acquisition, Modeling and Management*, 11th European Workshop, Dagstuhl Castle, Germany, May 26–29, 1999, 13–32.
Rubin, S.H., "A Heuristic Logic for Randomization in Fuzzy Mining," *Control and Intelligent Systems*, 1999, 27(1), 26–38.

Smalheiser, N.R., "Predicting Emerging Technologies with the Aid of Text–Based Data Mining: The Micro Approach," *Technovation*, 2000, 21(10), 689–693.

* cited by examiner

Primary Examiner—Jean M. Corrielus
Assistant Examiner—Isaac M. Woo
(74) Attorney, Agent, or Firm—Woodcock Washburn LLP

(57) ABSTRACT

Systems and methods are provided for generating prediction queries to help a user build and execute prediction queries. A user interface (UI) is provided that is easy to use and understand in connection with the generation of a prediction query for data mining. The UI can be instantiated from a variety of disparate sources that may request query building services. While prediction queries and relational queries are quite different, the UI enables prediction queries to be built in a manner that is similar to the way relational queries are built. In one embodiment, the main screen of the UI includes four main components: (1) a table column mapping area, (3) a selection grid area, (4) a query text display area and (5) a query result grid area. In one embodiment, the query text display area and the query result grid area are initially not presented to the user.

43 Claims, 13 Drawing Sheets

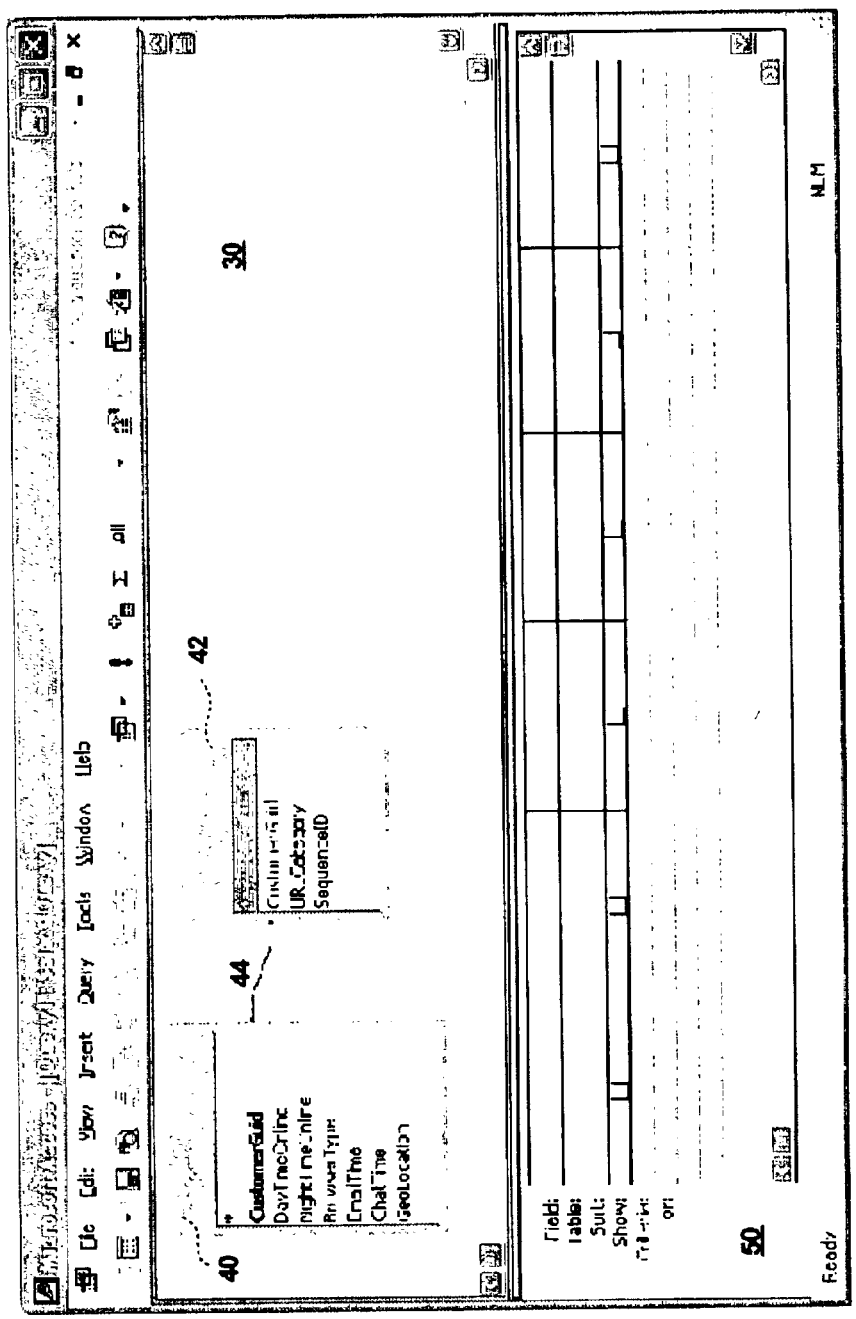
FIG. 1 - Prior Art

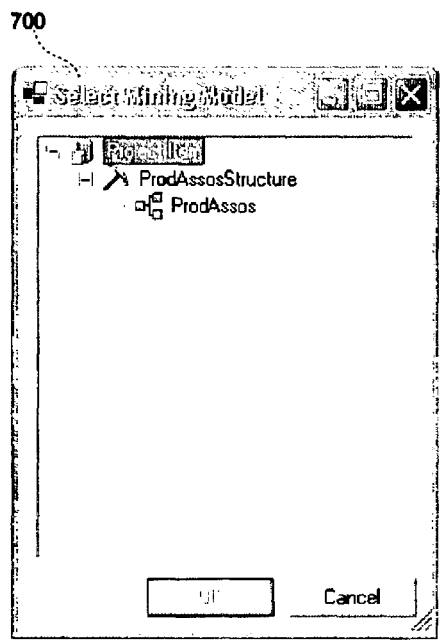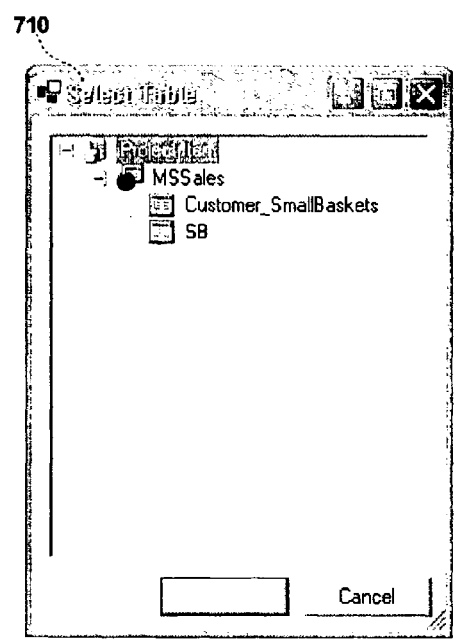
FIG. 7A  FIG. 7B

Select SessionID, (Select $Sequence, SequenceID,
Predict(Page) from PredictSequence(Sequences, 3))
On .....

Select Topcount((select URLCategory, $adjustedProbability as
prob From Predict([Web Click], INCLUDE_STATISTICS,
EXCLUSIVE)), prob, 5)

FIG. 10

SYSTEMS AND METHODS FOR GENERATING PREDICTION QUERIES

FIELD OF THE INVENTION

The present invention is directed to systems and methods for generating and executing prediction queries.

BACKGROUND OF THE INVENTION

A prediction query for data mining (DM) applies a prediction model to transactional data, or other kinds of data, and generates predictive results that can serve as the basis for sound business decisions in marketing, operations, budgeting and many other areas as well. The advantages and capabilities for data mining are similar to those of On-Line Analytical Processing (OLAP), but break much more ground. Like OLAP, DM exists to help one obtain qualitative information from otherwise dry, transactional data. While OLAP achieves this by optimizing drill-down queries and letting users observe patterns in data, DM actively analyzes data and determines patterns on its own. DM is based in part on artificial intelligence (AI) principles and algorithms, and is also based heavily on statistics. DM is relevant to a variety of applications, including, but not limited to, client/server applications and services, data warehousing, web site personalization, on-line customer assessment, fraud detection, etc.

FIG. 1 illustrates an exemplary prior art user interface for a relational query builder 30. For instance, join operations between relational tables 40 and 42 can be specified, and automatic mappings 44 are created between tables 40 and 42. Grid view 50 enables a user to select, e.g., "drag and drop," columns from any of the tables to the grid in order to build a join query in a relational system. Relational query builder 30 thus provides a standard way to build relational queries; however, to date, there is no standard way to build a prediction query.

An application or object that allows prediction models to be built using data mining algorithms is sometimes called a prediction query builder or generator. A prediction query builder typically can be applied to a variety of kinds and sizes of databases. In this regard, a prediction query builder enables the incorporation of predictive data mining models (DMM) from wherever they may be located. A DMM is like a relational table, except that it typically includes special columns that can be used for data training and prediction making, i.e., the DMM enables both the creation of a prediction model and the generation of predictions. Unlike a standard relational table, though, which stores raw data, a DMM stores the patterns discovered by the particular data mining algorithm that was utilized.

A prediction join operation is an operation that is mapped to a join query between a trained data mining model and a designated input data source so that one can generate a tailored prediction result. The prediction result can then be stored, interpreted, output or displayed in a variety of formats.

Whatever the platform may be to interact with the data, in order to access the data to be mined, a DM engine formulates a query according to the format of the platform, e.g., SQL Server, in which the data is stored. Regardless of the platform, describing a prediction query in an unambiguous way can be challenging. Thus, creating prediction queries from scratch can be a complex, tedious and error-prone process. Among all other data mining tools currently available in the marketplace, there is no product that provides a simple, graphical way to build a prediction query. Thus, there exists a need in data mining products for a tool that can assist a user in building and executing a data mining prediction query in a standard manner, simply and easily. There is still further a need for a prediction query builder that allows a user to build data mining queries in a manner similar to building/executing relational join queries. There is thus a need for improvement over these and other deficiencies of the prior art.

SUMMARY OF THE INVENTION

In view of the foregoing, the present invention provides systems and methods for generating prediction queries to help a user build and execute prediction queries. A user interface (UI) is provided that is easy to use and understand in connection with the generation of a prediction query for data mining, and the UI can be instantiated from a variety of disparate sources that may request query building services. While prediction queries and relational queries are quite different, the UI of the invention enables prediction queries to be built in a manner that is similar to the way relational queries are built. In one embodiment, the main screen of the UI includes four main components: (1) a table column mapping area, (2) a selection grid area, (3) a query text display area and (4) a query result grid area. In one embodiment, the query text display area and the query result grid area are initially invisible.

Other features and embodiments of the present invention are described below.

BRIEF DESCRIPTION OF THE DRAWINGS

The file of this patent includes at least one drawing executed in color. Copies of this patent with color drawings will be provided by the United States Patent and Trademark Office upon request and payment of the necessary fee.

The system and methods for generating prediction queries in accordance with the present invention are further described with reference to the accompanying drawings in which:

FIG. 1 is a prior art illustration of a UI for a relational query builder;

FIGS. 7A to 7C illustrate exemplary aspects of inputting mining model(s) and input table(s) in accordance with the invention;

FIG. 10 illustrates an exemplary generation of a prediction query and associated syntax in accordance with the invention.

DETAILED DESCRIPTION OF THE INVENTION

Overview

As explained in the background, there exists a need in data mining for a tool that can assist a user in building and executing a data mining prediction query. The prediction query builder of the present invention allows a user to build data mining queries in a manner similar to building/executing relational join queries. In one aspect, the data mining model is treated similarly to a relational table and predictions are treated similarly to a join operation. However, instead of joining two relational tables, the present invention joins a relational table with a mining model. An improved UI permits a user to use line segments to mark the join condition and build the query simply and easily. In one embodiment, the main screen of the UI includes four main components: (1) a table column mapping area, (2) a selection grid area, (3) a query text display area and (4) a query result grid area. In one embodiment, the query text display area and the query result grid area are initially not presented to the user.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with a prediction query generation process. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local prediction query generation services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate a prediction query generation process that may utilize the techniques of the present invention.

Figure 2A:
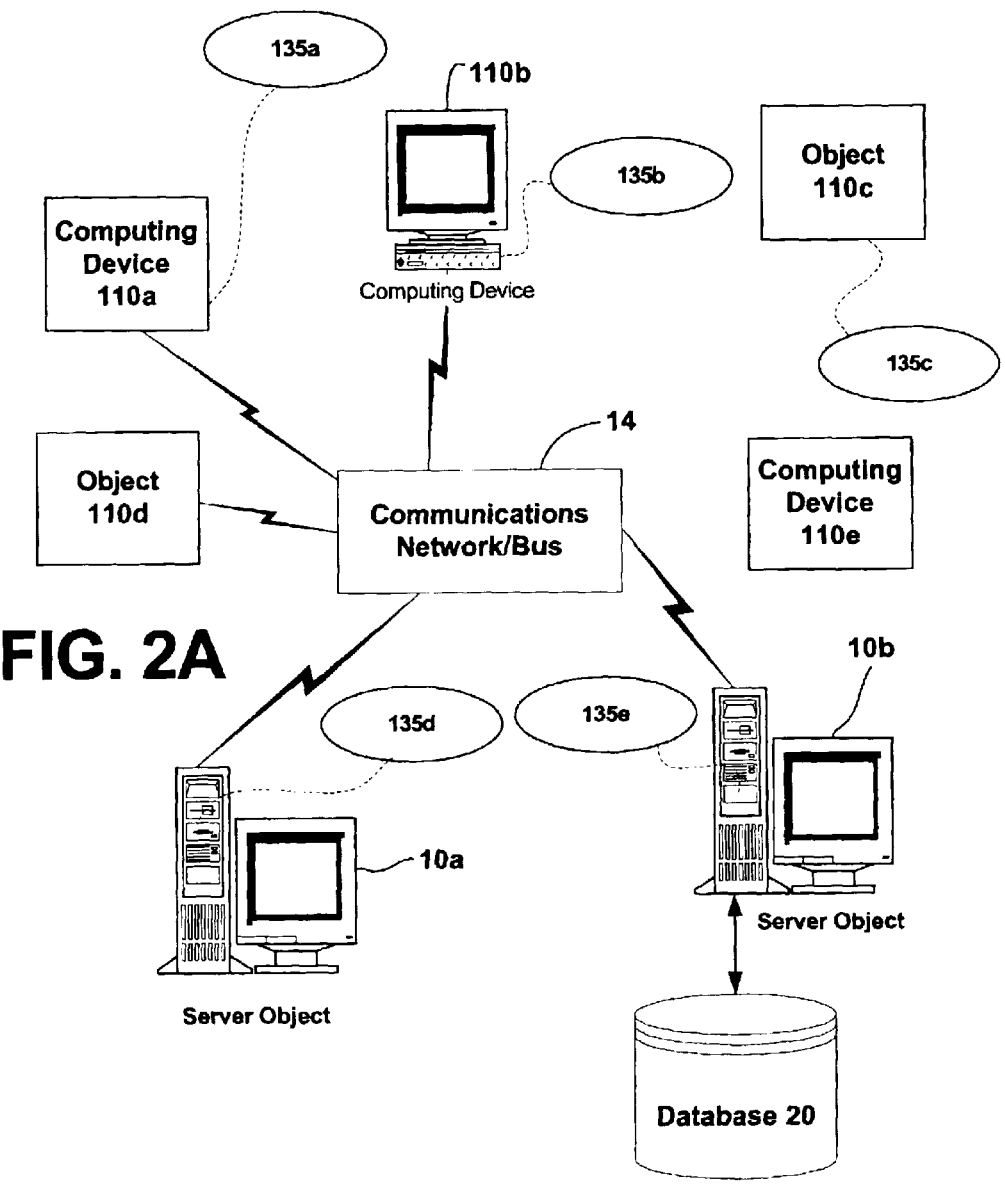
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, personal computers, etc. Each object can communicate with another object by way of the communications network 14. This network may itself comprise other computing objects and computing devices that provide services to the system of FIG. 2A. In accordance with an aspect of the invention, each object 10a, 10b, etc. or 110a, 110b, 110c, etc. may contain an application that might request forward mapping services.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Prediction query generation and execution services and interfaces in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since data may in practice be physically located in one or more locations, the ability to distribute prediction query generation and execution services and interfaces is of great utility in such a system.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice, e.g., telephone, and entertainment media. Most home control devices such as light switches and appliances may use power line for connectivity. Data Services may enter the home as broadband (e.g., either DSL or Cable modem) and are accessible within the home using either wireless, e.g., Home Radio Frequency (HomeRF) or 802.11b, or wired, e.g., Home Phoneline Networking Appliance (PNA), Cat 5, even power line, connectivity. Voice traffic may enter the home either as wired, e.g., Cat 3, or wireless, e.g., cell phones, and may be distributed within the home using Cat 3 wiring. Entertainment media, or other data, may enter the home either through satellite or cable and is typically distributed in the home using coaxial cable. IEEE 1394 and digital video interface (DVI) are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to prediction query generation and execution in accordance with the present invention.

The Internet commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a video cassette recorder (VCR), television (TV), oven, light, heater and the like in accordance with the present invention. It is thus contemplated that the present invention may apply to any computing device in connection with which it is desirable to process or display prediction data.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files or images may be downloaded or migrated. Any computer 10a, 10b, 110a, 110b, etc. may be responsible for the maintenance and updating of a database 20 or other storage element in accordance with the present invention, such as a database or memory 20 for storing data or intermediate object(s) processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
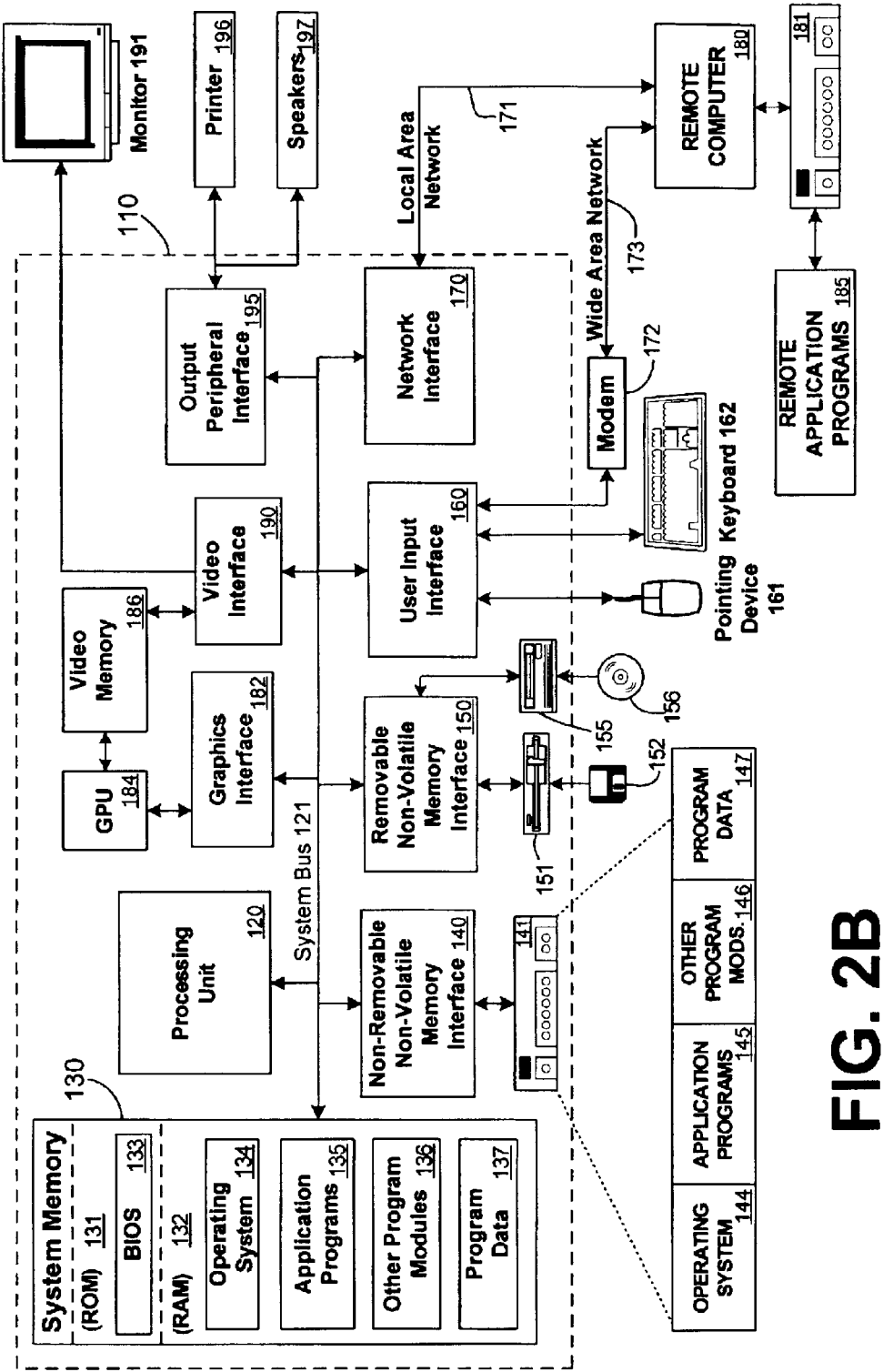
FIG. 2B is a block diagram representing an exemplary non-limiting computing device in which the present invention may be implemented.

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation of the prediction query generation and execution techniques of the invention.

Although not required, the invention can be implemented via an operating system, for use by a developer of services for a device or object, and/or included within application software that operates in connection with the prediction query generation and execution techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML,(3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between any of a coprocessor, a display device and requesting object, such that prediction query generation and execution services may be performed by, supported in or accessed via all of .NET's languages and services, and in other distributed computing frameworks as well.

Data Mining Prediction Query Building

The present invention thus provides systems and methods for generating prediction queries to help a user build and execute prediction queries. A UI is provided that is easy to use and understand in connection with the generation of a prediction query for data mining, and the UI can be instantiated from a variety of disparate sources that may request query building services. In one embodiment, users are able to build data mining prediction queries in a way that is intuitively similar to building a join query for data restricted to relational database(s).

As mentioned above, there exists a need in data mining products for a tool that can assist a user in building data mining prediction queries in a standard manner. In one aspect, the prediction query builder of the invention allows a user to build data mining queries in a manner similar to building/executing relational join queries. The data mining model is treated like a relational table and a prediction is treated like a join operation, however, instead of joining two relational tables, the invention enables the joining of a relational table with a mining model. At least one difference between join operations in connection with a relational query builder and join operations in connection with a prediction query builder is that a relational query builder joins the tables such that the data in each table can be related, e.g., records in table A and corresponding records in table B can be related in some fashion depending on the join type whereas the prediction query builder of the invention joins lines by mapping columns from the source relational data to corresponding columns in the mining model. In the relational case, both tables are input data. In the prediction query builder case, mapping(s) are defined from at least one source table to the mining model definition so that when the query is executed, the mining model receives data fed into the correct columns. Other differences may be evident from further description herein. Towards the above goal(s), an improved UI is provided in accordance with the invention, which permits a user to specify simple two point "A-B" or "B-A" line segments to mark the join condition and build the query.

The invention thus helps users to build data mining prediction queries, which can otherwise become a complex detail-oriented query drafting task. In one embodiment, the tool of the invention is similar to some relational query builder tools.

One of the open issues for data mining products is to allow user to build a prediction query. As mentioned in the background, most products do not include a query language for data mining. Some other products do provide query languages for data mining prediction; however, these languages are very different than languages used for relational databases, and it is very difficult to write without specific expertise to do so.

The invention thus proposes a way to help user to build/execute data mining prediction queries in the same way as building/executing relational join queries. A data mining model is thus considered in a way that is similar to the way a relational table is traditionally treated. A prediction query is thus considered a join; however, instead of joining two relational tables, a relational table is joined with a data mining model. A user can delineate line segments by any input means, e.g., mouse, keyboard, trackball, joystick, tablet pad, etc., to mark the join condition. The following figures illustrate some of the main concepts of the prediction query builder tool of the invention.

Figure 3A:
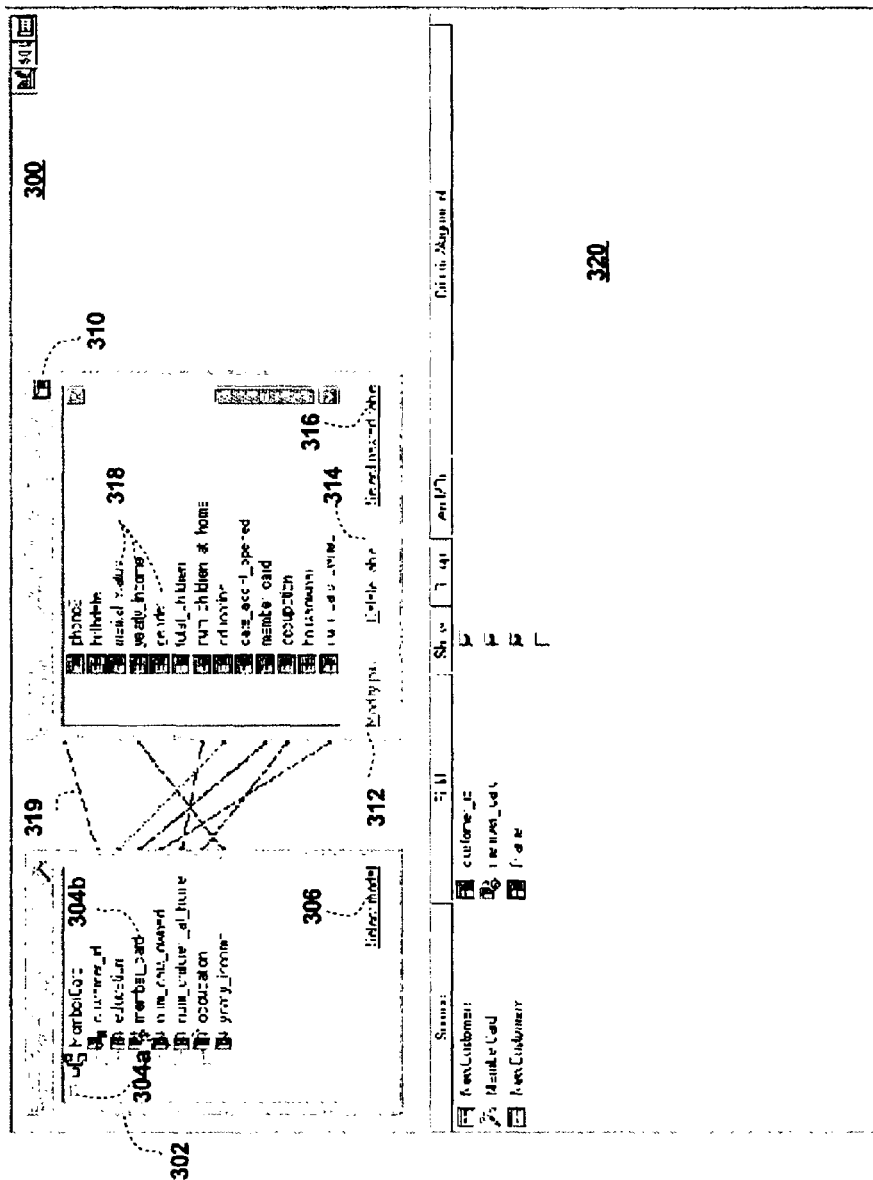
FIGS. 3A and 3B illustrate a main screen of an exemplary embodiment of the UI of the invention.
Figure 3B:
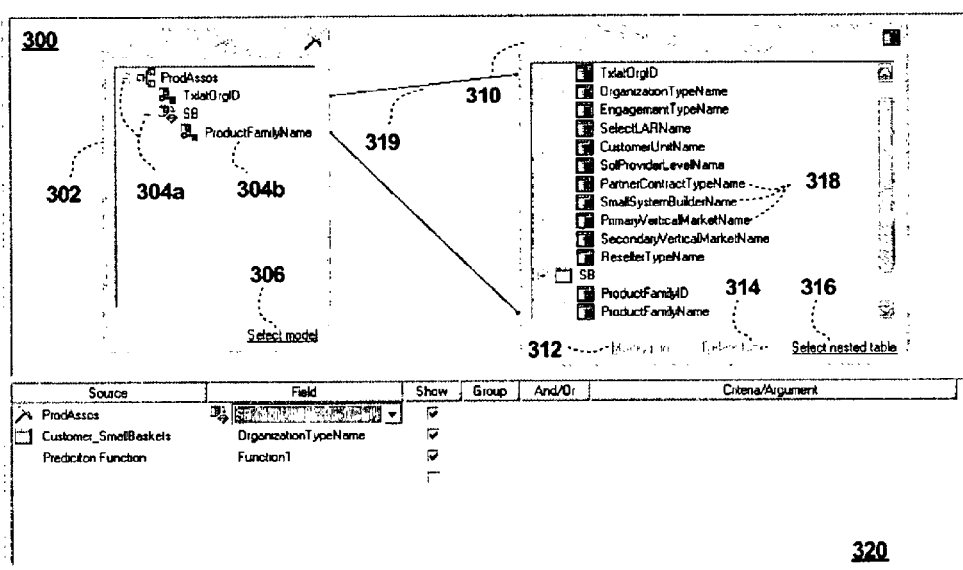
Figure 9A:
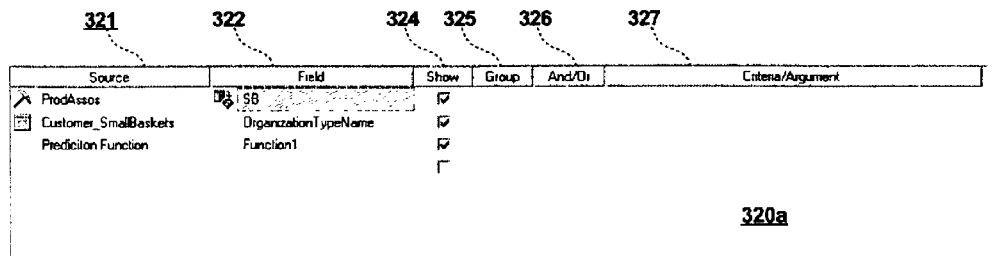
FIGS. 9A and 9B illustrate exemplary aspects of a selection grid area in accordance with the invention.
Figure 9B:
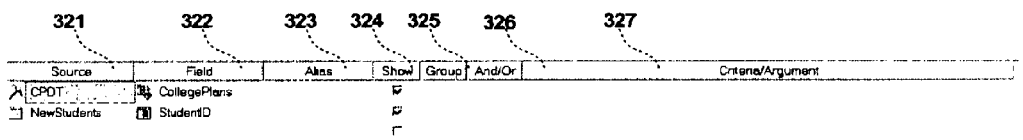

For instance, FIGS. 3A and 3B illustrate a prediction query builder main screen. FIGS. 3A and 3B are the main query design screen, with a first portion (the top part in this design) and a second portion (the bottom part in this design). In the top part, or first portion 300, there are two frames 302 and 310 with tree views. The left one 302 is a mining model with mining model columns shown by familiar file structure 304a. The predictable column 304b (member_card in this case) has a diamond icon. Frame 302 includes a select model link 306 to select a model in a familiar way. In other embodiments of the invention, links, such as links 306, are implemented as other kinds of UI elements, such as standard buttons and the like. The right frame 310 is the schema of a relational table. Frame 310 includes a modify join link 312, a delete table link 314 and a select nested table link 316. The nested table link 316 enables a user to link tables having specific hierarchical and nested relationships according to their relationships. A user can then link columns between mining models 304b and input tables 318 by drawing line segments 319, using any conventional input means, similar to the way a user builds a join query in a relational system. The bottom part 320 is the selection grid. With the selection grid, a user can select, e.g., "drag and drop," columns from any of the top tree views to the grid, similar to the way a user builds join query in a relational system. Also, similar to a relational grid and described in more detail below, a user can utilize dropdown controls, or other suitable controls, in the grid to instead select columns of a mining model, various functions, or define custom expressions in the grid. Exemplary embodiments of grid 320 are illustrated in FIGS. 9A and 9B below.

Contribution(s) of the invention, shown in FIGS. 3A and 3B, include, but are not limited to, the display of data mining model as a relational table, and the adoption of a query builder UI familiar to users to build data mining prediction queries. No other data mining products have thus far used these concepts.

Figure 4:
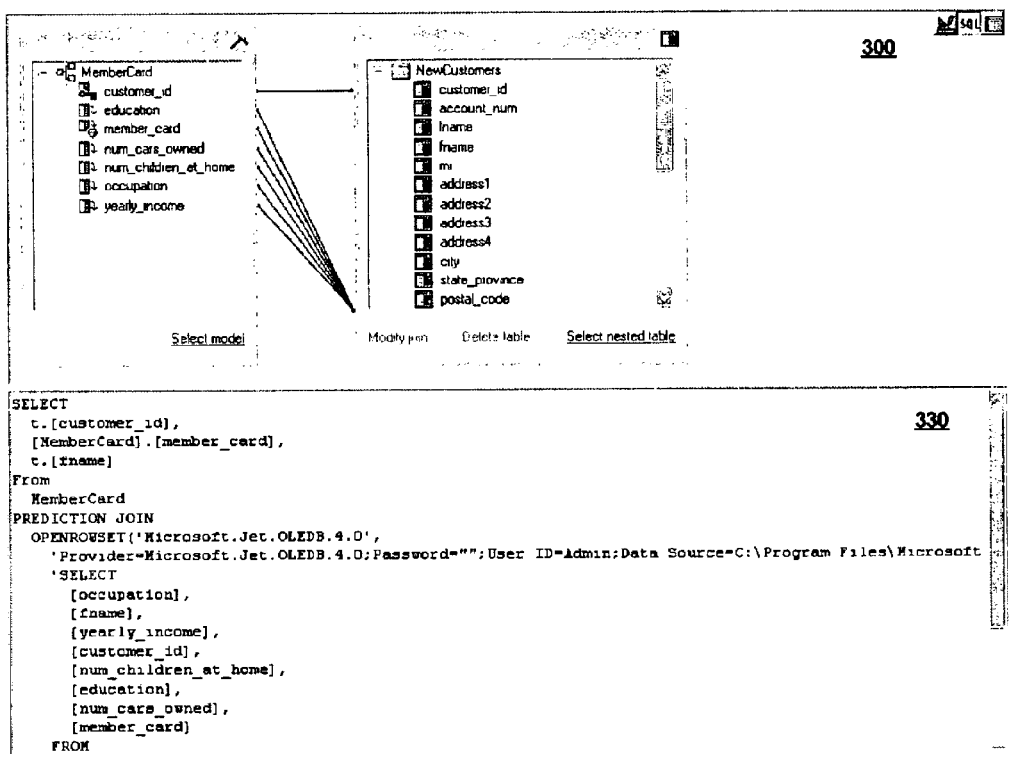
FIG. 4 illustrates an exemplary display of query syntax of a prediction query in accordance with the present invention.

FIG. 4 illustrates a prediction query builder SQL view 330 based on the query designed in FIG. 3A. In this particular non-limiting example, the query syntax is based on object linking and embedding database (OLE DB) for DM query language. This is similar to a SQL view in a traditional relational query builder, but instead is suited to prediction queries. One can see from this example that the prediction query automatically generated by the simple join operations of the invention is quite complex.

Figure 5:
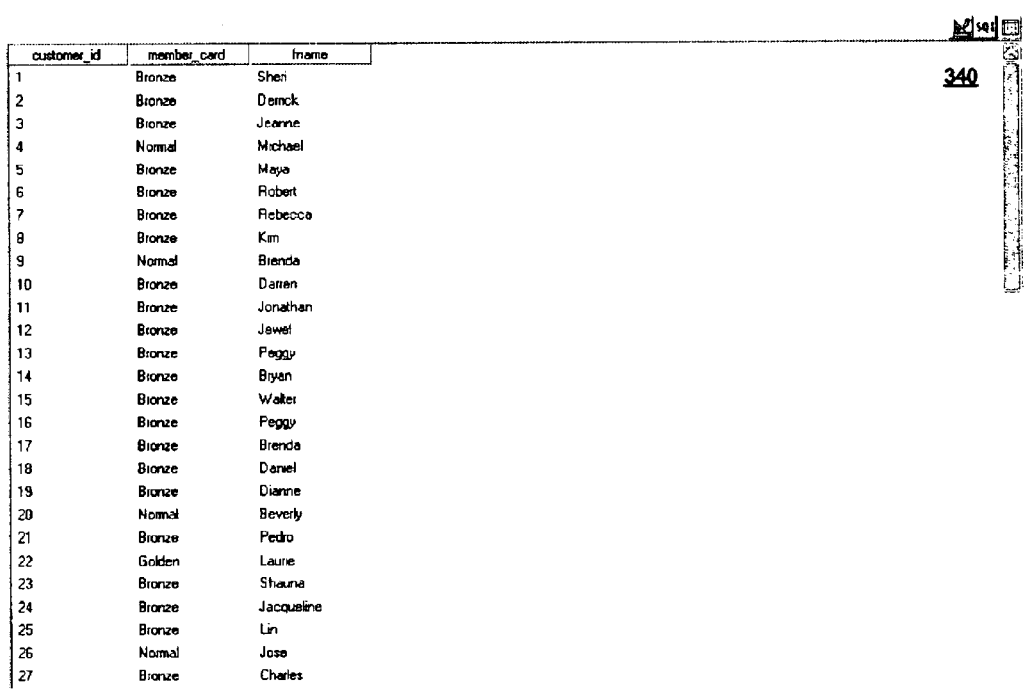
FIG. 5 illustrates exemplary results of an execution of a prediction query in accordance with the invention.

FIG. 5 is a prediction query builder grid view 340, which displays the result(s) of the prediction query, after the prediction query generated in FIG. 4 has been executed. This is similar to the grid view shown as the result of a traditional join operation in the relational database context. While not illustrated, if the mining model contains nested tables, the result grid 340 of the invention also supports hierarchical results.

Data mining prediction is an important step in data mining, and thus providing a product having new functionality with a look and feel that many users can already appreciate is an objective achieved in accordance with the invention. The invention thus adopts a classic relation query builder UI to help a user to generate/execute prediction queries.

As mentioned above in connection with FIGS. 3A and 3B, the main screen of the UI includes four main components: (1) a table column mapping area, (2) a selection grid area, (3) a query text display area and (4) a query result grid area. In one embodiment, the query text display area and the query result grid area are initially invisible.

Figure 6:
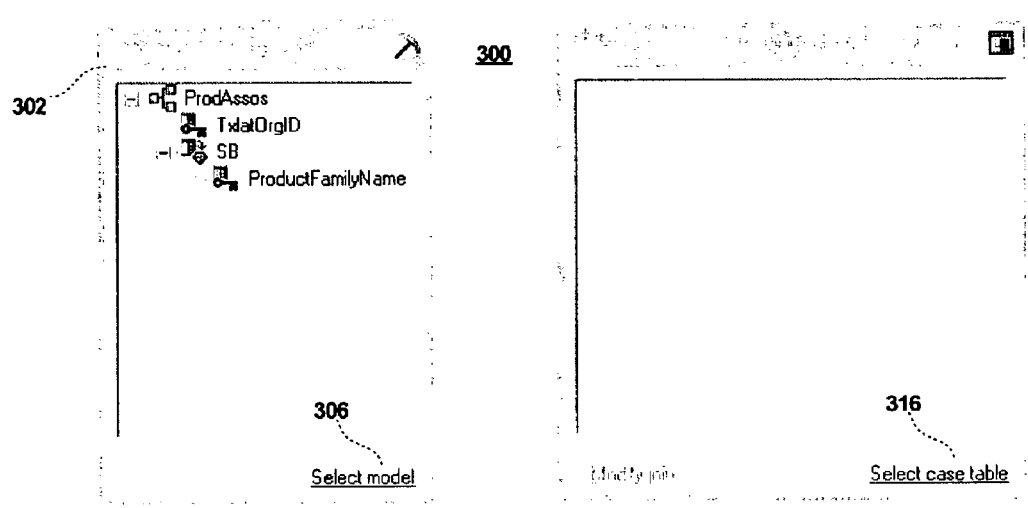
FIG. 6 illustrates an exemplary table mapping column area in accordance with the invention.

The invention will now be described with reference to various more detailed, but nonlimiting embodiments. In connection with the table column mapping area 300, at the initial stage, as shown in FIG. 6, the user specifies the mining model based upon which prediction is going to take place by selecting link 306.

The select mining model list box 700 shown in FIG. 7A displays the list of mining models in the solution. It is possible for the user to select a mining model within the project, or refer to an existing model from a server. In one embodiment, the default mining model is the first one in the list of derived mining models.

Once the model is selected, the hyper link 316 to "Select one or more input tables" becomes enabled. The user can follow the hyper link 316 to select the input tables based on the mining model structure selected. Thus, once the mining model is selected, the user can pick input tables for prediction (the 'Select tables' link 316 is enabled). While clicking on the link, the user is prompted if he wants to select the table from existing Data Source Views (DSVs) or from a live server.

Figure 7C:
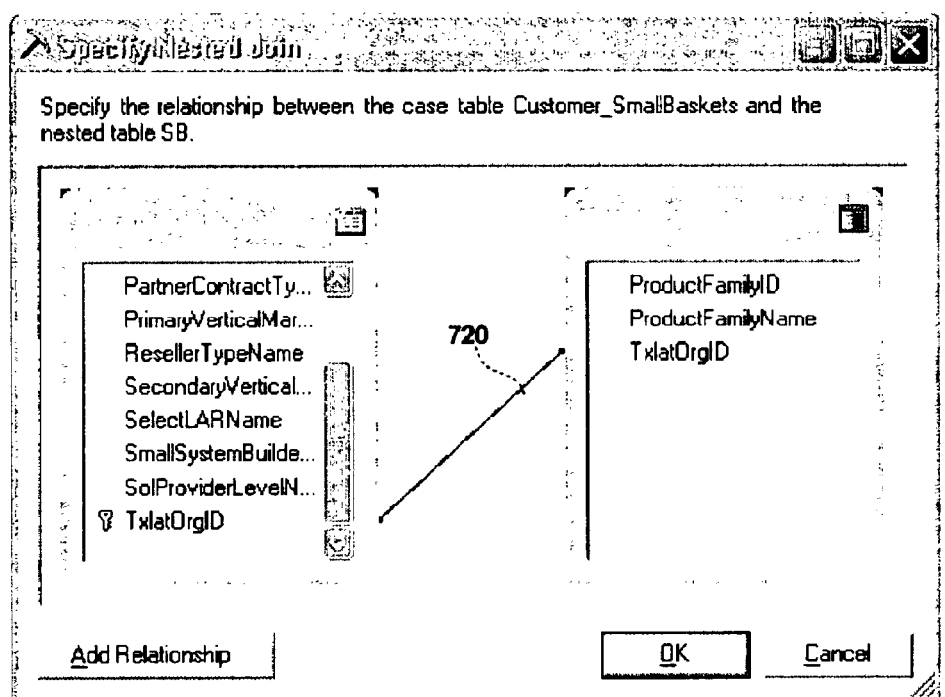

FIG. 7B illustrates an exemplary "Selecting case table or nested tables for prediction" UI object 710, enabling a user to select input source objects. Then, as illustrated in FIG. 7C, if there are nested tables, the user draws the mapping 720 between the case table and any nested tables.

Figure 8:
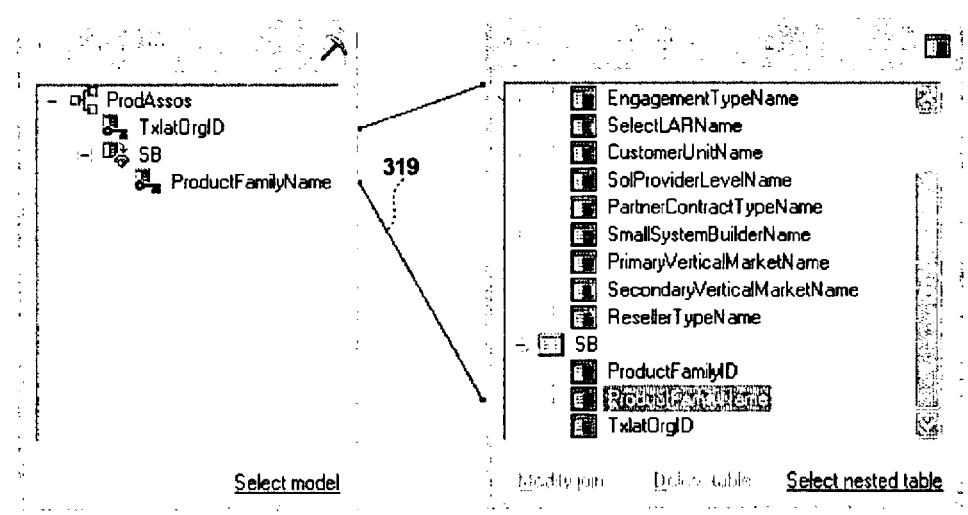
FIG. 8 illustrates automatic mapping of model names and table names in accordance with the invention.

As illustrated in FIG. 8, when the table selection wizard is done, the user is returned to the prediction query builder main screen with the columns of the input table populated as per the selections of FIGS. 7B and 7C. Columns from model and tables, which have same name, are then automatically mapped.

FIGS. 9A and 9B illustrate exemplary implementations for a grid 320a or grid 320b, on which a user can select, e.g., drag-drop, columns from mining model columns, input table columns and available prediction functions. The source column 321 allows a user to select columns from the mining model, input tables, prediction functions or user expression. The Field column 322 allows the user to pick the columns or prediction functions. The alias column 323 gives the user the option to rename the display name of a column in the result grid view. The show column 324 gives the user the option to show a source in the grid 320a or 320b. The Group column 325 allows the user to group Boolean expressions together while the And/Or column 326 allows a user to specify the expression. The user can type the condition or user expression in the criteria column 327.

FIG. 10 illustrates another exemplary prediction query 1000 generated in accordance with the invention showing how complicated such a query can be. The simple selection and mapping/join operation of the invention generates such complex queries automatically and thus is of great utility from the standpoint of preventing mistakes, and saving time in learning and programming prediction query syntax. In one embodiment, via any common input means, e.g., keyboard and the like, a user can manually edit text generated by the builder, e.g., SQL syntax, and save the modifications. This functionality is optionally provided for convenience, and, in one implementation, the builder does not load UI state from the query text, i.e., the UI does not reflect changes to the query text.

Exemplary items in the toolbar for the UI of the invention include: (1) Save, which saves a query, (2) Open, which opens a query, (3) Run, which executes the query, Show syntax, which displays the query syntax in a window and (5) Design/Grid Viewer toggle, which switches back to the design view or to the query result view.

In one embodiment, the invention provides support for a singleton query, wherein a choice is added at the bottom of the Input Table Grid, which invokes a hierarchical grid with two columns: Attribute and Value. The user can type the value for some attributes and when returned to the main screen, the columns associated with the values are automatically mapped.

Conclusion

The Data Mining (DM) prediction query builder, or generator, of the invention is a data mining tool that helps a user to build and execute prediction queries. In this regard, the present invention provides a user interface (UI) that is easy to use and understand in connection with the generation of a query for data mining, and can be instantiated from a variety of disparate sources that may request query building services. It is noted that a relational query and a prediction query are unrelated in purpose and effect; however, in one aspect, the UI of this invention includes a "feel and effect" similar to a relational query building model.

As mentioned above, while exemplary embodiments of the present invention have been described in connection with various computing devices and network architectures, the underlying concepts may be applied to any computing device or system in which it is desirable to generate and execute prediction queries. Thus, the techniques for providing prediction query generation and execution in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent prediction query generation and execution achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for generating a prediction query, comprising:

selecting at least one mining model;

selecting at least one input table;

joining at least one element of the at least one mining model with at least one element of the at least one input table;

generating a prediction query in response to said joining; and displaying a table column mapping area and a selection grid area;

where said selection grid area includes at least one of a source column, a field column, an alias column, a show column, a group column, an And/Or column, and a criteria column, wherein the source column allows a user to select at least one column from at least one of (A) at least one mining model, (B) the at least one input table, (C) at least one available prediction function and (D) at least one user expression, wherein the field column allows a user to pick at least one column and at least one prediction function, where n the alias column allows a user to rename the display name of a column in the result grid view, wherein the show column allows a user to show a source in the grid area, wherein the group column allows the user to group at least two boolean expressions together, wherein the And/Or column allows a user to specify a boolean expression and wherein the user can type the condition or user expression in the criteria column.

2. A method according to claim 1, further comprising:
joining at least one column of the a first input table with at least one column of second input table.

3. A method according to claim 1, further comprising:
executing said prediction query thereby producing at least one prediction result data set.

4. A method according to claim 3, further comprising:
displaying the at least one prediction result data set in a grid view.

5. A method according to claim 1, further comprising:
displaying at least one element of said at least one mining model; and
displaying at least one element of said at least one input table.

6. A method according to claim 5, further including displaying said at least one mining model as a relational table.

7. A method according to claim 1, wherein said at least one input table is at least one relational table.

8. A method according to claim 1, wherein said joining includes specifying a line segment to mark a join condition.

9. A method according to claim 1, wherein displaying the table column mapping area includes at least one of (A) displaying said at least one mining model with at least one mining model column and (B) displaying at least one schema of at least one relational table of said at least one input table having at least one input table column.

10. A method according to claim 9, further comprising dragging and dropping to said selection grid area at least one column from at least one of (A) a mining model of the table column mapping area and (B) an input table of the table column mapping area.

11. A method according to claim 10, wherein if there are nested tables, further comprising inputting a mapping between a case table and a corresponding nested table.

12. A method according to claim 10, further comprising selecting at least one available prediction function in said selection grid area.

13. A method according to claim 1, wherein displaying the table column mapping area includes displaying a nested table link enabling a user to link a table having specific hierarchical and nested relationships to said at least one input table.

14. A method according to claim 1, wherein said joining includes linking at least one column of said at least one mining model and to at least one column of said at least one input table by inputting at least one line segment therebetween.

15. A method according to claim 1, further comprising:
displaying query syntax of the generated prediction query.

16. A method according to claim 1, wherein said selecting at least one mining model includes selecting one of a trained mining model within an opened project and an existing model from a server.

17. A method according to claim 16, wherein the default selected mining model is the first one in a list of derived mining models.

18. A method according to claim 1, wherein said selection of at least one input table includes selecting one of a table from existing Data Source Views and a table from a server.

19. A method according to claim 1, further comprising:
automatically displaying a mapping between an element from a model of said at least one mining model and an element from a table of said at least one input table, when the elements have same name.

20. A method according to claim 1, further comprising:
displaying a toolbar, wherein said toolbar includes at least one of a (A) a save component, which saves a prediction query, (B) an open component, which opens a query, (C) a run component, which executes a prediction query, (D) a show syntax component, which displays query syntax associated with a prediction query in a window and (E) a design/grid viewer toggle component, which switches back and forth between a design view and a query result view.

21. At least one of an operating system, driver code, an application programming interface, a tool kit and a coprocessing device for providing the image rendering of claim 1.

22. A modulated data signal carrying computer executable instructions for performing the method of claim 1.

23. A computing device comprising means for performing the method of claim 1.

24. A computing system for generating a prediction query, comprising:
means for selecting at least one mining model;
means for selecting at least one input table;
means for joining at least one element of the at least one mining model with at least one element of the at least one input table;
means for generating a prediction query in response to said means for joining; and
means for displaying a table column mapping area and a selection grid area;
where said selection grid area includes at least one of a source column, a field column, an alias column, a show column, a group column, an And/Or column, and a criteria column, wherein the source column allows a user to select at least one column from at least one of (A) at least one mining model, (B) the at least one input table, (C) at least one available prediction function and (D) at least one user expression, wherein the field column allows a user to pick at least one column and at least one prediction function, where in the alias column allows a user to rename the display name of a column in the result grid view, wherein the show column allows a user to show a source in the grid area, wherein the group column allows the user to group at least two boolean expressions together, wherein the And/Or column allows a user to specify a boolean expression and wherein the user can type the condition or user expression in the criteria column.

25. A computing system according to claim 24, further comprising:
  means for joining columns between said at least one input table.

26. A computing system according to claim 25, further comprising:
  means executing said prediction query thereby producing at least one prediction result data set.

27. A computing system according to claim 26, further comprising:
  means for displaying the at least one prediction result data set in a grid view.

28. A computing system according to claim 25, further comprising:
  means for displaying at least one element of said at least one mining model; and
  means for displaying at least one element of said at least one input table.

29. A computing system according to claim 28, further including means for displaying said at least one mining model as a relational table.

30. A computing system according to claim 25, wherein said at least one input table is at least one relational table.

31. A computing system according to claim 25, wherein said means for joining includes means for specifying a line segment to mark a join condition.

32. A computing system according to claim 25, wherein said means for joining includes means for linking at least one column of said at least one mining model and to at least one column of said at least one input table by inputting at least one line segment therebetween.

33. A computing system according to claim 25, further comprising:
  means for displaying query syntax of the generated prediction query according to said means for generating.

34. A computing system according to claim 25, wherein said means for selecting at least one mining model includes means for selecting one of a trained mining model within an opened project and an existing model from a server.

35. A computing system according to claim 34, wherein the default selected mining model by said means for selecting is the first one in a list of derived mining models.

36. A computing system according to claim 25, wherein said means for selecting at least one input table includes selecting one of a table from existing Data Source Views and a table from a server.

37. A computing system according to claim 25, further comprising:
  means for automatically displaying a mapping between an element from a model of said at least one mining model and an element from a table of said at least one input table, when the elements have same name.

38. A computing system according to claim 25, further comprising:
  means for displaying a toolbar, wherein said toolbar includes at least one of a (A) a save component, which saves a prediction query, (B) an open component, which opens a query, (C) a run component, which executes a prediction query, (D) a show syntax component, which displays query syntax associated with a prediction query in a window and (E) a design/grid viewer toggle component, which switches back and forth between a design view and a query result view.

39. A computing system according to claim 24, wherein the means for displaying the table column mapping area includes at least one of (A) means for displaying said at least one mining model with at least one mining model column and (B) means for displaying at least one schema of at least one relational table of said at least one input table having at least one input table column.

40. A computing system according to claim 39, further comprising means for dragging and dropping to said selection grid area at least one column from at least one of (A) a mining model of the table column mapping area and (B) an input table of the table column mapping area.

41. A computing system according to claim 40, wherein if there are nested tables, further comprising means for inputting a mapping between a case table and a corresponding nested table.

42. A computing system according to claim 40, further comprising means for dragging and dropping at least one available prediction function to said selection grid area.

43. A computing system according to claim 39, wherein the means for displaying the table column mapping area includes means for displaying a nested table link enabling a user to link a table having specific hierarchical and nested relationships to said at least one input table.

* * * * *